United States Patent [19]
Meric

[11] 3,901,599
[45] Aug. 26, 1975

[54] ANALYSIS OF PULVERULENT MATERIAL USING A LASER BEAM SUBJECTED TO VARIABLE REFRACTION TO PRODUCE PULSES

[75] Inventor: Jean Paul Meric, Paris, France

[73] Assignee: Centre d'Etudes et de Recherches de l'Industrie des Liants Hydrauliques, Paris, France

[22] Filed: July 18, 1973

[21] Appl. No.: 380,095

[30] Foreign Application Priority Data
July 19, 1972 France .............................. 72.25951

[52] U.S. Cl. ................. 356/85; 331/94.5 Q; 356/86
[51] Int. Cl.² ............................................ G01J 3/30
[58] Field of Search ............ 356/85, 86; 331/94.5 Q

[56] References Cited
UNITED STATES PATENTS 3,337,738   8/1967   Price ..................................... 356/86
3,463,591   8/1969   Franken et al. ....................... 356/85
3,680,959   8/1972   Schuch et al. ........................ 356/86
3,782,823   1/1974   Kantorski et al. .................... 356/85

OTHER PUBLICATIONS

"Laser–Spark .... Materials"; Whitehead et al.; Applied Spectroscopy; Vol. 22, No. 1, 1968; pg. 7–12.

Primary Examiner—Vincent P. McGraw
Attorney, Agent, or Firm—Haseltine, Lake & Waters

[57] ABSTRACT

The analysis is performed using a laser generator which is controlled, e.g. by a variable refractive index device, to cause a laser beam pulse to be emitted. The beam vaporizes some of the pulverulent material, the pulse being of a duration short enough to prevent fractional distillation of the pulverulent material. Light intensity measuring means are used to observe the relative intensities of spectral lines in the light emitted by the vaporized pulverulent material.

8 Claims, 3 Drawing Figures

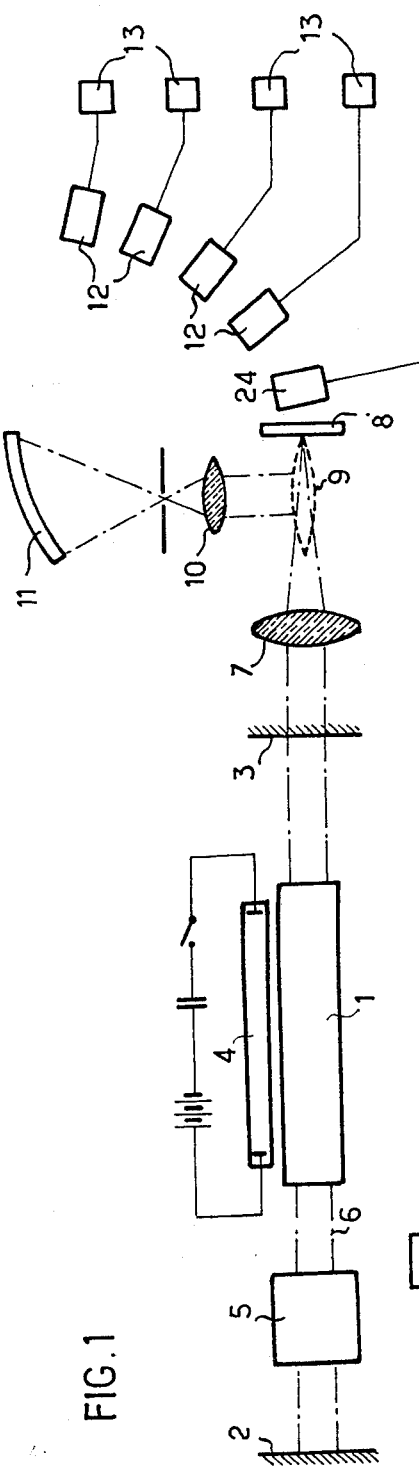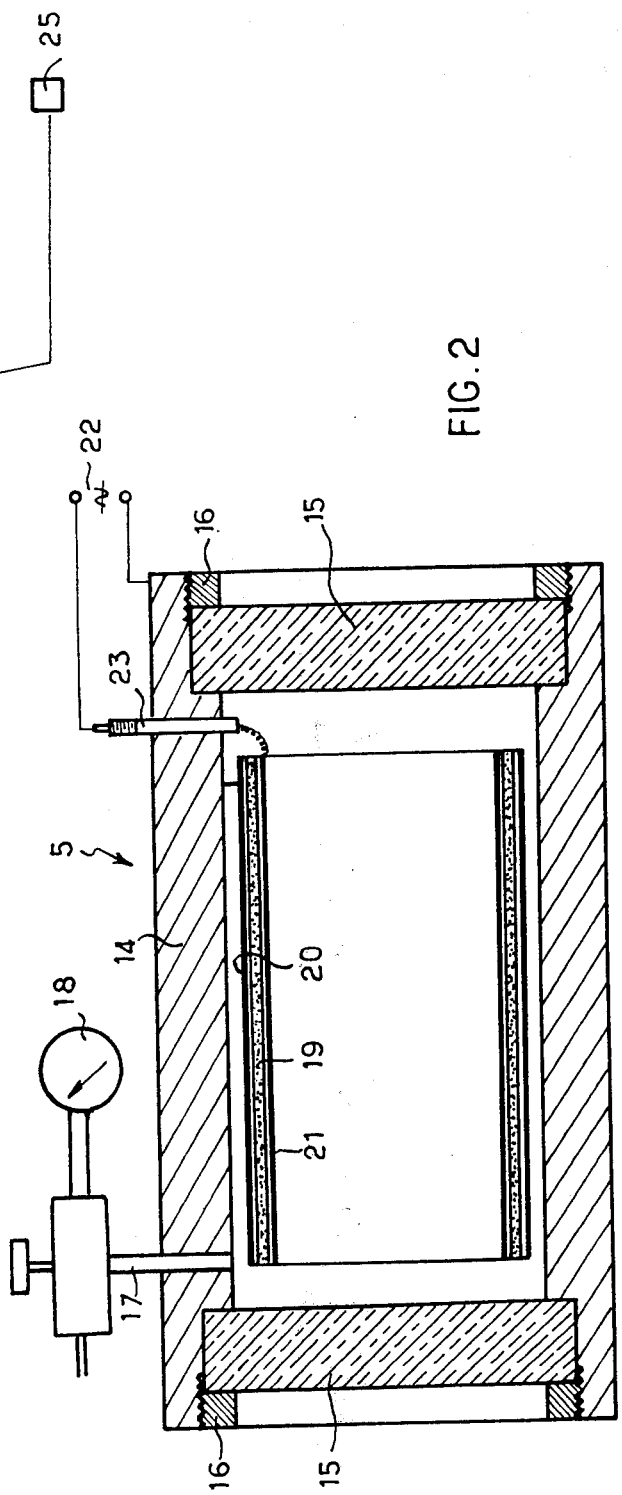

ANALYSIS OF PULVERULENT MATERIAL USING A LASER BEAM SUBJECTED TO VARIABLE REFRACTION TO PRODUCE PULSES

BACKGROUND OF THE INVENTION

1. Field of Invention

The invention relates to the analysis of pulverulent material using a laser beam.

2. Description of Prior Art

The analysis of mineral material is a critical procedure since such materials exhibit low reactivity and are, generally, in the form of a heterogeneous powder.

Currently, chemical or physical methods are employed for the elementary analysis of mineral materials. In the former case, it is necessary to dissolve the powder in a liquid, and in the second case, for example when a certain fluorescence is used, it is necessary to fuse the powder in order to convert it to a perfectly homogenous glass. All these operations for the preparation of the sample require considerable time and are critical. They involve errors, and due to their complexity, they constitute an obstacle to automatic analysis.

It has been proposed to analyze a mineral material by vaporizing it with the aid of a laser beam. Such vaporization is accompanied by an emission of light the spectrum of which depends on the chemical composition of the powder to be analyzed. The sample requires no preparation. Also, under the action of the laser beam, total decomposition of the material into its elementary constituents takes place. The mineralogical and granular structure of the sample under investigation therefor no longer plays any part and it no longer constitutes a source of disturbance, as is the case with the physical or chemical processes hitherto utilized.

However, the analysis of a mineral material with the aid of a laser bear has, hitherto, not proved suitable for practical utilization.

In fact, not only does vaporization of the material take place, but also fractional distillation may occur and it is found that the measurement of an element is affected by the presence of other elements. In other words, the true content of the powder in respect of one element may be very considerably larger or smaller than the content measured, depending on the content of the further elements accompanying the first element. This analysis process has hitherto been found to be not absolutely reliable. It is possible, to a certain extent, to obtain approximate values of the various contents with the aid of graphic tables or charts, but automation is impossible.

SUMMARY OF THE INVENTION

Apparatus for the analysis of pulverulent material in accordance with this invention comprises a laser generator for producing a laser beam to impinge on the pulverulent material for vaporizing some of the pulverulent material; variable means for varying the intensity of the laser beam to cause a laser beam pulse to impinge on the pulverulent material, the pulse having a duration short enough substantially to prevent fractional distillation of the pulverulent material; and light intensity measuring means for observing the relative intensities of spectral lines in the light emitted by the vaporised pulverulent material.

In an embodiment of the invention, the laser generator comprises two reflecting means defining respective ends of an optical path within the laser generator and the variable means is disposed optically between the reflecting means. The variable means may be constituted by means which has a variable refractive index, it comprising a housing for containing a fluid, means providing an optical path through the housing, and means for producing standing pressure waves in the fluid.

An advantage that can be achieved with such an apparatus is that the analysis of pulverulent mineral material can be made practically free from error; furthermore, the apparatus may be utilised in automatic manner.

BRIEF DESCRIPTION OF THE DRAWINGS

For a better understanding of the invention, and to show how the same may be carried into effect, reference will now be made, by way of example, to the accompanying drawings, in which:

FIG. 1 diagrammatically illustrates an apparatus for the analysis of pulverulent material;

FIG. 2 is a view in section of a variable means for varying the intensity of a laser beam, in the form of a variable refractive index device.

DETAILED DESCRIPTION OF THE INVENTION

Figure 3:
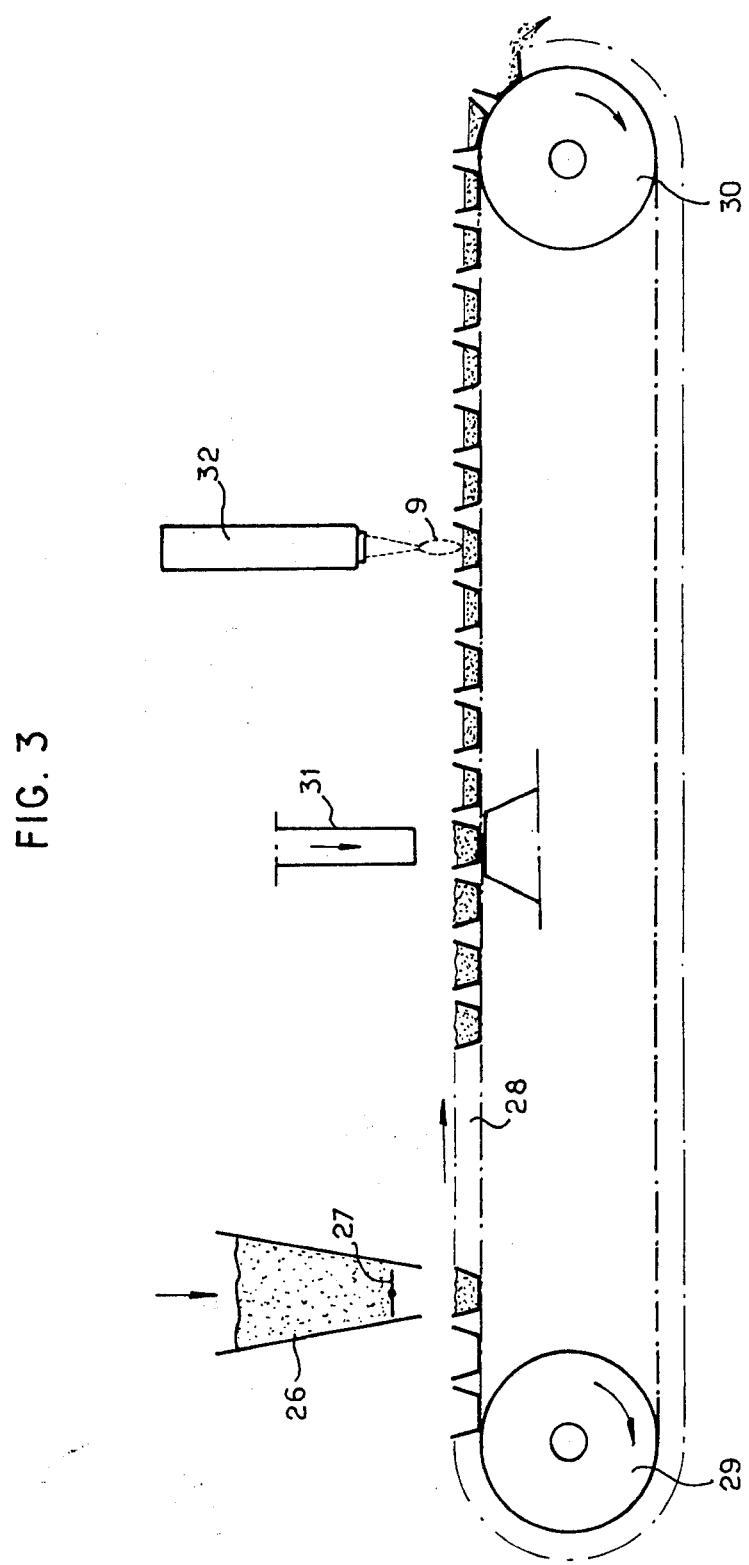
FIG. 3 is a diagram showing an apparatus for automatic and continuous analysis of pulverulent material.

Referring to FIG. 1, the apparatus comprises a laser generator which is of the solid type. The laser generator comprises a bar 1 made from glass doped with neodymium. The bar 1 is interposed between a mirror 2 and a semi-reflecting surface 3. A flash tube 4 is disposed at the bar 1 for triggering laser emission. The variable index device 5 is interposed between the bar 1 and the mirror 2 on the optical path of the beam 6.

A lens 7 is provided for focusing the laser beam onto a sample 8 of powder to be analyzed. The sample has been slightly compacted before the beam impinges on it.

During the laser emission, the beam extracts from the sample a few milligrams which are completely vaporized. The vaporized sample will constitute a plasma 9. The apparatus also comprises a light intensity measuring means, or quantometer, disposed to observe the plasma. The measuring means comprises a lens 10, a diffraction grating 11 and a plurality of photomultipliers 12 for observing, and facilitating storage in a memory of, the light energies of various specific respective spectral lines which will be emitted by the excited elements present in the plasma. The photomultipliers may be arranged to observe the following spectral lines:

Ca 3706.0 A
Ti 3088 A
Si 2987.6 A 2881 A
Al 2816.1 A
Mg 1781.4 A
Fe 2598.3 A

Each photomultiplier comprises a capacitor which is charged as a function of the energy received and is connected to a voltmeter 13.

As will be seen more particularly in FIG. 2, the variable index device 5 comprises a metal tubular housing 14 sealed in fluid-tight manner by glass plates 15 retained by rings 16.

The interior of the tube may be connected by a conduit 17 to a source of gas, there being a pressure gauge 18 for monitoring the gas pressure. Disposed within the tube 14 is a cylinder 19 of piezo-electric material, which may be, for instance a ceramic material. The cylinder 19 is interposed between two metal electrodes 20 and 21. The electrodes 20 and 21 are connected to a source of high frequency voltage 22. The connection of one electrode 20 to a terminal of the source 22 is via the housing 14, the other electrode 21 being connected to the source via an emission plug 23. The frequency of the source 22 is preferably equal to the pseudofrequency of natural emission of the laser, so that the device 5 permits passage only of the largest peaks of such emission. In operation, the cylinder 19 contracts periodically in synchronism with the excitation current and imparts vibratory movement to the gaseous mass which it contacts. In the case of predetermined frequencies standing waves are set up in the cylinder. There is thus produced a resonance phenomenon permitting the achievement of large pressure gradients. These pressure gradients are accompanied by a refractive index gradient imparting to the device optical properties similar to those of a lens. The variable index device is alternately convergent and divergent for light rays parallel to the cylinder axis, at a frequency equal to that of the electrical excitation current. When the device is convergent or divergent, the rays are deflected and laser emission cannot take place. On the other hand, when it passes from the convergent state into the divergent state, or vice versa, its convergence is zero during an extremely short period of time. The rays are able to be reflected from the end mirrors of the laser generator, and emission takes place.

Experiment has shown that when the laser generator is provided with such a device, there is no longer fractional distillation and measurements may be obtained which are perfectly representative of the true contents, thus permitting automatic functioning.

On triggering the flash tube 4, the light emission produced in the bar 1 is reflected between the mirror 2 and the semi-reflecting surface 3, meanwhile being amplified. This emission is not able to pass through the variable index device 5 except when the convergence or divergence of the device is zero. The beam passes through the semi-reflecting surface 3 and impinges on the sample 8, thereby producing the plasma 9. The photomultipliers 12 store a voltage corresponding respectively to the light energies of the spectral lines which they respectively observe. The voltages are readout at the respective voltmeters 13 which may be directly graduated with reference to the content of the elements which have emitted the respective spectral lines.

Since the energy of each laser emission is constant, the mass of varporized material is also constant. Thus the analysis apparatus is able to function without an internal gauging or reference means.

However, if an internal gauging or reference means should be desired, it is possible to utilize as such a means the total radiation of the plasma, between approximately 3500 and 3600 A, measured with the aid of a photomultiplier 24 connected to a voltmeter 25, employing zero order of the grating 11. Thereby, the precision of the arrangement may be greatly improved.

FIG. 3 shows an embodiment of an apparatus suitable for automatic analysis.

A hopper or funnel 26 contains the material to be analyzed and is sealed by blocking means 27. Disposed under the said hopper is a bucket chain 28 extending between drums 29 and 30 and passing successively under the hopper 26, under a compacting device 31 the purpose of which is to prevent the powder from being projected due to the action of the plasma, and under the laser generally designated by reference numeral 32. The assembly is synchronized in such manner that the blocking means 27 opens when a bucket of the chain 28 passes under the hopper 26 and permits passage of a quantity of powder corresponding to a given bucket filling rate. The powder is then compacted by the compactor 31 and the laser emission is tripped when the bucket reaches a location before the laser 32. The bucket is then emptied on passing over the drum 30.

What is claimed is:

1. Apparatus for the analysis of pulverulent material comprising;
    a laser generator for producing a laser beam to impinge on the pulverulent material for vaporizing some of the pulveralent material, said laser generator including a pair of opposite end mirrors at least one of which is semi-transparent;
    variable means disposed between said mirrors in the path of the laser beam for producing short pulses of high intensity of said laser beam which achieve vaporization of the pulveralent material without fractional distillation, said variable means comprising a sealed housing containing a fluid and having ends which are transparent to the laser beam and means in said housing externally stimulated for producing standing pressure waves in the fluid accompanied by a refractive index gradient, and
    light intensity measuring means for observing the relative intensities of spectral lines in light emitted by the vaporized pulverulent material.

2. Apparatus as recited in claim 1, wherein said variable means is operable cyclically such that the emission of the laser beam is for a period of time which is short relative to the period of cyclical variation.

3. Apparatus as recited in claim 1, wherein said wave producing means comprises a cylinder of piezo-electric material encircling the optical path, and, on the cylinder, electrodes connectable to an oscillatory voltage source for energizing the piezo-electric material.

4. Apparatus are recited in claim 1, wherein the light intensity measuring means comprises means for measuring substantially the whole spectrum.

5. Apparatus as recited in claim 1, wherein the light intensity measuring means comprises a diffraction grating for separating the frequency components of a spectrum, and a plurality of photomultipliers arranged to detect and measure the intensity of a respective plurality of the components.

6. Apparatus as recited in claim 5, wherein the measuring means also comprises means for measuring substantially the whole spectrum to provide a reference for the measuring means.

7. Apparatus as recited in claim 1, and additionally comprising a first container for containing pulverulent material, further containers, means for apportioning the material from the first container amongst the further containers, means for compacting the pulverulent material in the further containers, and means for conveying the further containers successively past the compacting means and past a station where the laser beam can impinge upon the pulverulent material contained in the container.

8. Apparatus as recited in claim 7, and additionally comprising means for synchronizing the operation of the apportioning means, the compacting means, the conveying means and the laser generator, so that the apportioning means, the compacting means and the laser generator operate only when further containers are respectively in predetermined positions.

* * * * *